United States Patent

Bremer et al.

Patent Number: 5,691,417
Date of Patent: Nov. 25, 1997

[54] COATING MEDIUM, THE USE THEREOF, AND A PROCESS FOR MULTILAYER COATING

[75] Inventors: Gerhard Bremer, Frechen; Hermann Kerber, Wuppertal; Manfred Krumme, Erftstadt; Olaf Ley; Werner Stephan, both of Wuppertal, all of Germany

[73] Assignee: Herberts Gesellschaft mit Beschrankter Haftung, Germany

[21] Appl. No.: 672,131

[22] Filed: Jun. 27, 1996

[30] Foreign Application Priority Data

Jul. 7, 1995 [DE] Germany ............ 195 24 787.6

[51] Int. Cl.$^6$ ............................ C08G 18/62
[52] U.S. Cl. ............ 525/123; 525/374; 427/407.1; 427/409; 428/423.1; 428/425.8
[58] Field of Search ............... 525/123, 374; 427/407.1, 409; 428/423.1, 425.8

[56] References Cited

U.S. PATENT DOCUMENTS

| | | | |
|---|---|---|---|
| 5,279,862 | 1/1994 | Corcoran | 427/407.1 |
| 5,314,953 | 5/1994 | Corcoran | 525/123 |
| 5,399,384 | 3/1995 | Fushimi | 427/407.1 |

FOREIGN PATENT DOCUMENTS 432-0727  1/1995  Germany.
4407415  9/1995  Germany.

Primary Examiner—Fred Zitomer
Attorney, Agent, or Firm—Keck, Mahin & Cate

[57] ABSTRACT

A coating medium suitable for multilayer coatings, containing

A) copolymers containing hydroxyl groups, comprising
   a1) 8–12% by weight of vinyl esters of alpha, alpha, dialkyl-substituted, branched, aliphatic saturated monocarboxylic acids,
   a2) 32–42% by weight of hydroxyalkyl esters of (meth)acrylic acid,
   a2) 25–40% by weight of alkyl esters of (meth)acrylic acid,
   a4) 12–24% by weight of cycloalkyl esters of (meth)acrylic acid, and
   a5) 2–4% by weight of (meth)acrylic acid with a hydroxyl number of 100–160 mg KOH/g, an acid number of 10–50 mg KOH/g, a number average molecular weight (Mn) of 1000 to 3000 g/mole and a glass transition temperature (Tg) of 30°–80° C., B) polyisocyanates in a quantitative proportion such that 0.5 to 2 isocyanate groups are allotted to one hydroxyl group of component A), and C) solvents and optionally one or more pigments, extenders and/or customary lacquer additives.

7 Claims, No Drawings

COATING MEDIUM, THE USE THEREOF, AND A PROCESS FOR MULTILAYER COATING

This invention relates to two-component coating media based on hydroxy-functional (meth)acrylic copolymers and on polyisocyanates, which can be used in pigmented or non-pigmented form and are distinguished by their rapid drying. They have a high solids content and are employed in particular for the coating of vehicles and vehicle parts.

Two-component coating media based on a polyhydroxyl and a polyisocyanate component have long been known. These coating media produce high-quality coatings with very good resistance to chemicals and solvents and a high level of optical and mechanical properties. Within the context of general ecological requirements there is pressure to keep the solvent content or the proportion of volatile organic compounds (VOC) as low as possible in solvent-containing coating media of this type, and to achieve a high solids content in the ready-to-spray state. These so-called high solid lacquers (low VOC value) constitute an environmentally relevant alternative to water-thinnable coating media.

DE-A-43 20 727 describes solvent-based coating media based on polyisocyanates and hydroxy-functional (meth)acrylic copolymers which have short drying times and which can be applied without problems in one spraying operation only. The hydroxyl component is obtained from aromatic vinyl compounds, hydroxymethacrylates, alkyl (meth)acrylates and (meth)acrylic acid. These coating media are not high-solid lacquers, however. The solvent content of the finished coating medium is still unsatisfactorily high.

DE-A-43 10 414 describes non-aqueous clear lacquers based on polyacrylate/polyisocyanate, wherein the polyacrylate is composed of 10 to 51% by weight of 4-hydroxybutyl acrylate, 0–36% by weight of hydroxyethyl/ hydroxypropyl methacrylate, 28–85% by weight of aliphatic or cycloaliphatic esters of methacrylic acid and 0–3% by weight of (meth)acrylic acid. The binder vehicle system is mainly designed in order to obtain, under storing conditions (130°–140° C.), coatings which are stable as regards yellowing, and are acid- and scratch-resistant. The drying times are too long at lower hardening temperatures (room temperature –60° C.).

U.S. Pat. No. 5,279,862 and U.S. Pat. No. 5,314,953 describe a clear lacquer which is based on polyisocyanates and (meth)acrylic copolymers, wherein the copolymer is produced from styrene, methacrylic monomers selected from the group comprising methyl methacrylate, isobornyl methacrylate and cyclohexyl methacrylate, and a second group of methacrylic monomers selected from n-butyl methacrylate, isobutyl methacrylate and ethylhexyl methacrylate, and from hydroxyalkyl (meth)acrylates containing C1–C4 alkyl groups. The examples in these patent specifications discloses solids contents of the order of only 40% by weight. The gloss and body of coatings obtained from these lacquers are in need of improvement. Use of the binder medium in pigmented coatings is not mentioned. Moreover, styrene, which is toxic, has to be used in the production of these lacquers.

The object of the present invention was to provide styrene-free, isocyanate-crosslinking coating media which have a high solids content in their ready-to-spray state, which dry rapidly and which result in haze-free coatings of high gloss, high brilliance and good body.

This object is achieved by a coating medium containing
A) one or more copolymers containing hydroxyl groups, comprising a1) 8–12% by weight of one or more vinyl esters of alpha,alpha, dialkyl-substituted, branched, aliphatic saturated monocarboxylic acids, a2) 32–42% by weight of one or more hydroxyalkyl esters of (meth)acrylic acid, a3) 25–40% by weight of one or more alkyl esters of (meth)acrylic acid, a4) 12–24% by weight of one or more unsubstituted or substituted cycloalkyl esters of (meth)acrylic acid, and a5) 2–4% by weight of (meth)acrylic acid, with a hydroxyl number of 100–160 mg KOH/g, an acid number of 10–50 mg KOH/g, a number average molecular weight (Mn) of 1000 to 3000 g/mole and a glass transition temperature (Tg) of 30°–80° C., B) one or more polyisocyanates in a quantitative proportion such that 0.5 to 2 isocyanate groups are allotted to one hydroxyl group of component A), and C) one or more solvents and optionally one or more pigments, extenders and/or customary lacquer additives.

Component A) is preferably present in an amount of 40–90% by weight and component B) is preferably present in an amount of 10–60% by weight. In this respect, the percentages by weight of components A) and B) add up to 100% by weight.

A preferred embodiment of the coating media according to the invention contains, as component A), a (meth)acrylic copolymer comprising a1) 10–11% by weight of one or more vinyl esters of alpha,alpha, dialkyl-substituted, branched, aliphatic saturated monocarboxylic acids, a2) 35 to 39% by weight of one or more hydroxyalkyl esters of (meth)acrylic acid, a3) 30–36% by weight of one or more alkyl esters of (meth)acrylic acid, a4) 15–18% by weight of one or more optionally substituted cycloalkyl esters of (meth)acrylic acid, and a5) 2–4% by weight of (meth)acrylic acid, with a hydroxyl number of 140–155 mg KOH/g, an acid number of 20 to 30 mg KOH/g, a number average molecular weight (Mn) of 1200 to 2000 and a glass transition temperature (Tg) of 35° to 50° C.

The expression "(meth)acrylic" which is used in the present description and in the claims is synonymous with acrylic and/or methacrylic.

In the coating media according to the invention, a high solids content is obtained, preferably of 50 to 65% by weight, most preferably greater than 55% by weight, for example up to 60% by weight. These are what are termed high solid lacquers. It was surprising that the coating media could be sprayed well and dried rapidly despite their high solids content.

(Meth)acrylic copolymers can be produced by polymerisation by customary methods, e.g. bulk, solution or pearl polymerisation. The various polymerisation methods are well known and are described, for example, in Houben Weyl, Methoden der organischen Chemie [Methods of Organic Chemistry], 4th Edition, Volume 14/1, pages 24–255 (1961).

The solution polymerisation method is preferred for the production of the (meth)acrylic copolymers which can be used in the coating media according to the invention. In the course of this procedure, the solvent is placed in the reaction vessel and heated to its boiling temperature, and the monomer/initiator mixture is added continuously over a defined period. The polymerisation is preferably conducted at temperatures between 100° C. and 160° C., most preferably at 130° to 150° C.

The polymerisation reaction may be started with known polymerisation initiators. Examples of initiators which are preferably used for the polymerisation include: dialkyl peroxides, such as di-tert.-butyl peroxide, di-cumyl peroxide, di-tert.-amyl peroxides and ethyl-3,3-bis(tert.-amylperoxy)-butyrate; diacyl peroxides, such as dibenzoyl peroxide, di-lauroyl peroxide; peresters, such as tert.-butyl perbenzoate, tert.-butyl perpivalate and tert.-amyl perhexanoate; hydroperoxides, such as cumene hydroperoxide; azo compounds, such as azo-bis-cyclohexanecarbonitrile and azo-bis-isobutyronitrile.

Examples of suitable organic solvents which can advantageously be used in the solution polymerisation or also later in the coating medium according to the invention include: glycol ethers such as ethylene glycol dimethyl ether, propylene glycol dimethyl ether; glycol ether esters such as ethyl glycol acetate, butyl glycol acetate, 3-methoxy-n-butyl acetate, butyl diglycol acetate, methoxypropyl acetate; esters such as butyl acetate, isobutyl acetate, amyl acetate; ketones such as methyl ethyl ketone, methyl isobutyl ketone, cyclohexanone, isophorone; aromatic hydrocarbons (e.g. with a boiling range of 136°–180° C.), and aliphatic hydrocarbons.

Chain transfer agents can be used to regulate the molecular weight, such as mercaptans, thioglycolic acid esters, cumene, or dimeric alpha-methylstyrene, for example.

The hydroxy-functional (meth)acrylic copolymers of component A) preferably have a number average molecular weight of 1000 to 2000, most preferably 1200 to 1800 g/mole. Vinyl esters of alpha,alpha-dialkyl-substituted, branched, aliphatic saturated monocarboxylic acids, preferably of C5 to C13 monocarboxylic acids, most preferably of C9 to C11 monocarboxylic acids, for example the vinyl ester of neodecanoic acid, are used as monomer component a1) for the production of the hydroxy-functional (meth)acrylic copolymers (component A). These vinyl esters are obtained, for example, by the reaction of the aforementioned saturated monocarboxylic acids with acetylene. They are commercially available, e.g. as Veova 9, Veova 10 (commercial products of the Shell company).

Monomer component a2) comprises hydroxyalkyl esters of (meth)acrylic acid, preferably containing 2 to 6 C atoms in their hydroxyalkyl radical. Examples thereof include beta-hydroxyethyl (meth)acrylate, beta-hydroxypropyl (meth)acrylate, 1,4-butanediol mono(meth)acrylate, 1,6-hexanediol monoacrylate. A preferred embodiment of component a2) consists of selecting the hydroxyalkyl ester so that a ratio of primary to secondary hydroxyl groups of 40:60 to 20:80 is produced.

Monomer component a3) comprises alkyl esters of (meth) acrylic acid which are different from a2), and which preferably contain 1 to 6 C atoms as a straight chain or a branched chain in the alcohol radical. Examples thereof include methyl methacrylate, ethyl methacrylate, isopropyl methacrylate, n-butyl methacrylate, isobutyl methacrylate, ethyl acrylate, n-butyl acrylate, isobutyl acrylate, tert-butyl acrylate.

Monomer component a4) comprises cycloalkyl esters (cycloaliphatic esters) of (meth)acrylic acid which may be substituted and which preferably contain at least 4 C atoms in their alcohol radical. Cycloaliphatic esters containing 5, or particularly 6, C atoms in their alcohol radical are particularly preferred. The substituents preferably comprise one or more, e.g. up to three, alkyl groups, for example, particularly those containing 1 to 4 C atoms. Examples of these esters include cyclopentyl (meth)acrylate, cyclohexyl (meth)acrylate, tert.-butyl cyclohexyl (meth)acrylate, trimethylcyclohexyl (meth) acrylate.

Acrylic acid and/or methacrylic acid are used as component a5).

The solids content of the poly(meth)acrylate solutions obtained during the solution polymerisation is 55 to 80% by weight, for example, and is preferably 60 to 70% by weight.

The (meth)acrylic copolymers are combined with polyisocyanates (component B) as crosslinking agents in the coating media according to the invention. The proportion of polyisocyanate crosslinking agents is selected so that 0.5 to 2 isocyanate groups are allotted to one hydroxyl group of the (meth)acrylic copolymers.

Polyisocyanate component B) of the coating medium comprises any organic polyisocyanate containing free isocyanate groups which are aliphatically, cycloaliphatically, araliphatically and/or aromatically bonded. These are liquid at room temperature or can be liquefied by the addition of organic solvents. In general, the polyisocyanates preferably have a viscosity at 23° C. of 1 to 6000 mPa.s, particularly greater than 5 and less than 3000 mPa.s.

Polyisocyanates of this type are generally known, and are described, for example, in DE-A-38 29 587 or DE-A-42 26 243.

The polyisocyanates are preferably polyisocyanates or polyisocyanate mixtures which exclusively contain aliphatically and/or cycloaliphatically bonded isocyanate groups, and which have an average NCO functionality of 1.5 to 5, preferably 2 to 3.

Examples of polyisocyanates which are particularly suitable include "lacquer polyisocyanates" based on hexamethylene diisocyanate, 1-isocyanato-3,3,5-trimethyl-5-isocyanatomethyl-cyclohexane (IPDI) and/or bis (isocyanatocyclohexyl)-methane, and the derivatives of these diisocyanates known in the art which contain biuret, allophanate, urethane and/or isocyanurate groups, and which subsequently to their production are freed from excess starting diisocyanate, preferably by distillation, down to a residual content of less than 0.5% by weight.

Sterically hindered polyisocyanates of general formula

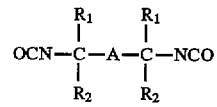

where $R_1$=H or $R_2$, $R_2$=$C_nH_{2n+}$, and where n=1 to 6, are also very suitable. The substituents $R_1$ and $R_2$ are either linear or branched, and are either the same or different. The basic skeleton A may consist of a single bond, a substituted or unsubstituted aromatic or alicyclic ring, or of an aliphatic linear or branched C chain containing 1 to 12 C atoms.

Examples thereof include 1,1,6,6,-tetramethyl-hexamethylene diisocyanate, 1,5-dibutylpentamethyl diisocyanate, p- or m-tetramethylxylylene diisocyanate and the corresponding hydrogenated homologues. These diisocyanates may also be converted in a suitable manner into compounds of higher functionality, for example by trimerisation or by reaction with water or trimethylolpropane.

Aromatic polyisocyanates are also suitable, but are less preferred. Examples thereof include polyisocyanates based on 2,4-diisocyanatotoluene or mixtures thereof with 2,6-diisocyanatotoluene, or those based on 4,4'-diisocyanatodiphenylmethane and trimers thereof.

The coating media according to the invention contain organic solvents. Examples of such solvents include those mentioned above for the production of the solution polymers.

The coating media according to the invention may contain pigments and/or extenders. All customary lacquer pigments of organic or inorganic nature are suitable as pigments. Examples of inorganic or organic colouring pigments and extenders include titania, micronised titania, iron oxide pigments, zinc phosphate (anti-corrosion pigments), azo pigments, phthalocyanine pigments, quinacridone or pyrrolopyrrole pigments, carbon black, silica, barium sulphate, french chalk, aluminium silicate, and magnesium silicate.

The coating media according to the invention may additionally contain customary lacquer auxiliary materials. Examples of these include levelling agents based on (meth) acrylic homopolymers or silicone oils, plasticisers such as phosphoric acid or esters of phthalic or citric acid, rheology influencing agents such as pyrogenic silica, hydrogenated castor oil or microgels, hardening accelerators for the crosslinking reaction of the hydroxy-functional binder vehicles with the polyisocyanates, e.g. organic metal salts such as dibutyltin dilaurate or zinc naphthenate, compounds containing tertiary amino groups such as triethylamine, and light stabilisers. The additives are used in the customary amounts familiar to one skilled in the art.

For the production of pigmented coatings, the individual constituents are mixed with each other and homogenised or ground in the usual manner. A procedure may be employed, for example, wherein part of the (meth)acrylic copolymer which contains hydroxyl groups is first mixed with the pigments and/or extenders and with customary lacquer additives and solvents and is triturated in grinding units. The ground material is thereafter completed by adding the residual (meth)acrylate copolymer solution.

Shortly before application, the binder vehicles containing hydroxyl groups, which are optionally present with pigments, extenders and customary lacquer additives, are thoroughly mixed with the polyisocyanates. The product is then adjusted to spraying viscosity with organic solvents.

The coating media produced in this manner are particularly suitable for the production of pigmented or transparent covering coats and of primer surfacer coats of an air-drying or forced-drying multilayer coating. However, they may also be hardened at higher temperatures of 80°–140° C., for example. They are suitable for the coating of vehicles and for industrial coating operations, for example, and are particularly suitable for the repair coating of vehicles and vehicle parts.

The coating media are applied by known methods, such as spraying, dipping, roller coating or doctor blade application. When used as a transparent clear lacquer coat they can be applied to conventional or aqueous base lacquers by the wet-into-wet process, for example, whereupon both coats are hardened jointly, e.g. for 15–20 minutes, e.g. at 50°–80° C. In the form of a pigmented covering lacquer coat they can be applied to customary single- or two-component primer surfacer coats, for example. The coating media according to the invention can also be applied as primer surfacer coats to customary primers, e.g. two-component epoxide primers, and can be dried at room temperature.

The present invention therefore also relates to a process for producing multilayer coatings or to the use of the coating media for producing multilayer coatings, wherein the covering lacquer, clear lacquer and/or primer surfacer coats in particular of multilayer coatings are formed by the coating media according to the invention.

The coating media according to the invention have a high solids content in their ready-to-spray state, and have a high reactivity and short drying times. They can be sprayed without problems.

It was surprising that this high reactivity was achieved despite the high proportion of secondary OH groups in the binder vehicle. Another significant advantage is the very good wetting of the pigment by the (meth)acrylate binder vehicle. Thus even carbon black, for example, which is difficult to disperse, can be dispersed without major problems. The adhesion of the coating media to the underlying lacquer coats is very good.

The invention is explained in more detail in the following examples.

Preparation of (meth)acrylic copolymers
(component A)

PREPARATION EXAMPLE 1

1500 g of an aromatic hydrocarbon with a boiling range of 164° to 185° C. and 325 g Veova 10 (a commercial product of Shell AG) were placed in a 6 liter three-necked flask with a standard taper-ground joint which was fitted with a contact thermometer, bead condenser and dropping funnel, and the mixture was heated with the reflux condenser turned on and with stirring to 147° C. A mixture of 85 g acrylic acid, 110 g butyl methacrylate, 145 g isobutyl methacrylate, 775 g tert.butyl acrylate, 500 g cyclohexyl methacrylate, 315 g hydroxyethyl methacrylate, 820 g 2-hydroxypropyl methacrylate, 100 g of an aromatic hydrocarbon with a boiling range of 164° to 185° C., 75 g d-tert.-butyl peroxide, 40 g tert.-butyl peroctoate and 60 g dicumyl peroxide was added continuously over a period of 6 hours. The batch was then polymerised for 4 hours at 147° C., cooled to 80° C. and diluted with 150 g of an aromatic hydrocarbon with a boiling range of 164° to 185° C. The polymer solution had a solids content of 65.0%, a viscosity of 3100 mPa.s at 25° C., an acid number of 27.0 mg KOH/g and an OH number of 140 mg KOH/g solid resin. The ratio of primary OH groups to secondary OH groups was 30:70.

PREPARATION EXAMPLE 2

750 g of an aromatic hydrocarbon with a boiling range of 164° to 185° C. and 162.5 g Veova 10 (a commercial product of Shell AG) were placed in a 4 liter three-necked flask with a standard taper-ground joint which was fitted with a contact thermometer, bead condenser and dropping funnel, and the mixture was heated with the reflux condenser turned on and with stirring to 147° C. A mixture of 42.5 g acrylic acid, 55 g butyl methacrylate, 72.5 g isobutyl methacrylate, 382.5 g tert.-butyl acrylate, 250 g cyclohexyl methacrylate, 105 g hydroxyethyl methacrylate, 467.5 g 2-hydroxypropyl methacrylate, 50 g of an aromatic hydrocarbon with a boiling range of 164° to 185° C., 37.5 g di-tert.-butyl peroxide, 20 g tert.-butyl peroctoate and 30 g dicumyl peroxide was added continuously over a period of 6 hours. The batch was then polymerised for 4 hours at 147° C., cooled to 80° C. and diluted with 75 g of an aromatic hydrocarbon with a boiling range of 164° to 185° C. The polymer solution had a solids content of 65.8%, a viscosity of 3320 mPa.s at 25° C., an acid number of 27.4 mg KOH/g and an OH number of 140 mg KOH/g solid resin. The ratio of primary OH groups to secondary OH groups was 20:80.

PREPARATION EXAMPLE 3

750 g of an aromatic hydrocarbon with a boiling range of 164° to 185° C. and 162.5 g Veova 10 (a commercial product of Shell AG) were placed in a 4 liter three-necked flask with a standard taper-ground joint which was fitted with a contact thermometer, bead condenser and dropping funnel, and the mixture was heated with the reflux condenser turned on and with stirring to 147° C. A mixture of 42.5 g acrylic acid, 55 g butyl methacrylate, 72.5 g isobutyl methacrylate, 395 g tert.-butyl acrylate, 250 g cyclohexyl methacrylate, 210 g hydroxyethyl methacrylate, 350 g 2-hydroxypropyl methacrylate, 50 g of an aromatic hydrocarbon with a boiling range of 164° to 185° C., 37.5 g d-tert.-butyl peroxide, 20 g tert.-butyl peroctoate and 30 g dicumyl peroxide was added continuously over a period of 6 hours. The batch was then polymerised for 4 hours at 147° C., cooled to 80° C. and diluted with 75 g of an aromatic hydrocarbon with a boiling range of 164° to 185° C. The polymer solution had a solids content of 65.7%, a viscosity of 3350 mPa.s at 25° C., an acid number of 29.8 mg KOH/g and an OH number of 140 mg KOH/g solid resin. The ratio of primary OH groups to secondary OH groups was 40:60.

EXAMPLE 4

Production of a clear lacquer 95 parts by weight of the copolymer solution from preparation example 1 were mixed with 4 parts by weight of 98/100% butyl acetate. The following constituents were then thoroughly mixed with each other in a clean, dry container:

88 parts by weight of the previously prepared mixture of copolymer solution and butyl acetate, 2.6 parts by weight 98/100% butyl acetate, 7.3 parts by weight ethoxypropyl acetate, 1.2 parts by weight of a commercially available light stabiliser, 0.48 parts by weight diethanolamine, and 0.36 parts by weight of a commercially available levelling agent.

EXAMPLE 5

Production of pigmented covering lacquers a) white covering lacquer 96 parts by weight of the copolymer solution from preparation example 1 were first mixed with 4 parts by weight of 98/100% butyl acetate. 26 parts by weight of the copolymer solution thus obtained were then mixed well with 2.5 parts by weight of a commercially available wetting agent, 1.5 parts by weight of a commercially available anti-settling agent and with 2 parts by weight of 98/100% butyl acetate, and 35.2 parts by weight of titania were subsequently stirred in. The mixture was then dispersed by means of customary dispersion methods. Thereafter, the mixture was completed by adding a binder vehicle solution comprising 28.7 parts by weight of the copolymer solution obtained in the first step, 2.5 parts by weight of butyl glycol acetate, 1 part by weight of a commercially available wetting agent and 0.5 parts by weight of dimethylethanolamine.

b) black lacquer 96 parts by weight of the copolymer solution from preparation example 1 were first mixed with 4 parts by weight of 98/100% butyl acetate. 13.5 parts by weight of the copolymer solution thus obtained were then mixed well with 3.6 parts by weight of a commercially available wetting agent and with 0.6 parts by weight of a commercially available anti-settling agent. 2.3 parts by weight of carbon black were subsequently stirred in. The mixture was then dispersed by means of customary dispersion methods. Thereafter, the mixture was completed by adding a binder vehicle solution comprising 78.5 parts by weight of the copolymer solution obtained in the first step, 1 part by weight of a commercially available levelling agent and 0.5 parts by weight of dimethylethanolamine.

EXAMPLE 6

Preparation of a hardener solution (component B)

The following hardener solution was prepared:

50 parts by weight of an aliphatic polyisocyanate based on hexamethylene diisocyanate, 10 parts by weight of a mixture of xylene isomers, 23 parts by weight Solvesso 100® (hydrocarbon mixture; boiling range 164°–180° C.), 4 parts by weight methoxypropyl acetate, 9 parts by weight n-butyl acetate (98%), 3.85 parts by weight ethoxypropyl acetate, 0.15 parts by weight dibutyltin dilaurate solution (10%).

Application of the coating media obtained

The previously produced clear lacquer from Example 4 and the pigmented covering lacquers from Example 5 were mixed in a volume ratio of 2:1 shortly before processing with the hardener solution from Example 6, in each case.

The clear lacquers obtained in this manner were applied by spray application to a solvent-based base lacquer coat, using a wet-into-wet method, to produce a dry coat thickness of 40–60 μm, and after a 5-minute ventilation phase were hardened for 30 minutes at 60° C. The pigmented covering lacquers were applied analogously to a customary two-component primer surfacer coat and were likewise hardened for 30 minutes at 60° C. The results of the lacquer technology investigations are illustrated in the following Table.

| Lacquer technology investigations | | | |
| --- | --- | --- | --- |
| | Clear lacquer | Covering lacquer/white | Covering lacquer/black |
| Solids content | 55% by weight | 65% by weight | 58% by weight |
| Dust-drying according to DIN 53 150 | 20 minutes | 30 minutes | 40 minutes |
| Air-drying (16 hours at 20° C.) | | | |
| Freedom from tack | + | + | + |
| Body/gloss | + | + | + |
| Flow | + | + | + |
| Force-drying (30 minutes at 60° C.) | | | |
| Freedom from tack (hot) | + | + | + |
| Freedom from tack (cold) | + | + | + |
| Body/gloss | + | + | + |
| Flow | + | + | + |

+ = very good

We claim:

1. A styrene-free coating medium, comprising;
  A) one or more copolymers containing hydroxyl groups, comprising;
    a1) 8–12% by weight of one or more vinyl esters of alpha,alpha,dialkyl-substituted, branched, aliphatic saturated monocarboxylic acids,
    a2) 32–42% by weight of one or more hydroxyalkyl esters of (meth) acrylic acid,
    a3) 25–40% by weight of one or more alkyl esters of (meth)acrylic acid,
    a4) 12–24% by weight of one or more unsubstituted or substituted cycloalkyl esters of (meth)acrylic acid, and
    a5) 2–4% by weight of (meth)acrylic acid,
with a hydroxyl number of 100–160 mg KOH/g, an acid number of 10–50 mg KOH/g, a number average molecular weight (Mn) of 1000 to 3000 g/mole and a glass transition temperature (Tg) of 30°–80° C., B) one or more polyisocyanates in a quantitative proportion such that 0.5 to 2 isocyanate groups are allotted to one hydroxyl group of component A), and C) one or more solvents and optionally one or more members selected from the group consisting of pigments and extenders;

wherein the styrene-free coating medium has a solids content of 50 to 65%, by weight.

2. A coating medium according to claim 1, wherein the copolymers, which contain hydroxyl groups, of component A) have a number average molecular weight of 1000 to 2000 g/mole.

3. A coating medium according to claim 1, which is formulated, free from pigment, as a clear lacquer.

4. A coating medium according to claim 1, which component a2) contains a mixture of hydroxyalkyl esters containing primary and secondary hydroxyl groups corresponding to a numerical ratio of primary to secondary hydroxyl groups from 40:60 to 20:80.

5. A process for the multilayer coating of a substrate comprising applying at least two coating layers, wherein a coating medium according to claim 1 is used for the production of a layer selected from the group consisting of a primer surfacer layer, a pigmented covering layer and a transparent covering layer.

6. A process according to claim 4, comprising multilayer coating of vehicles and vehicle parts.

7. A process according to claim 4, comprising repair coating of vehicles and vehicle parts.

* * * * *